(No Model.) 3 Sheets—Sheet 2.
D. M., P. V. & S. P. SCHERMERHORN.
APPARATUS FOR THE MANUFACTURE OF GAS BLACK.
No. 489,332. Patented Jan. 3, 1893.
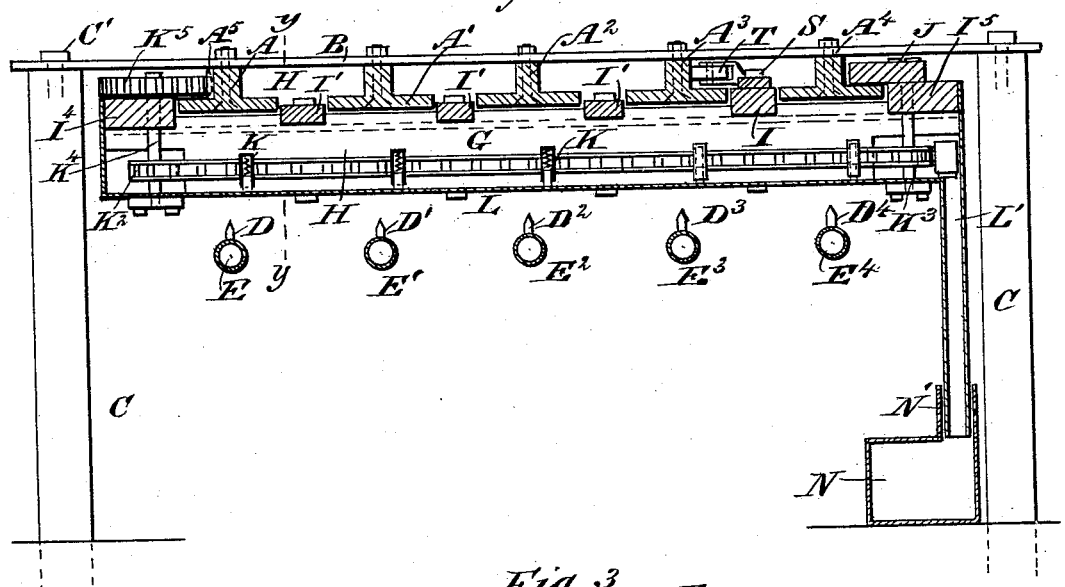
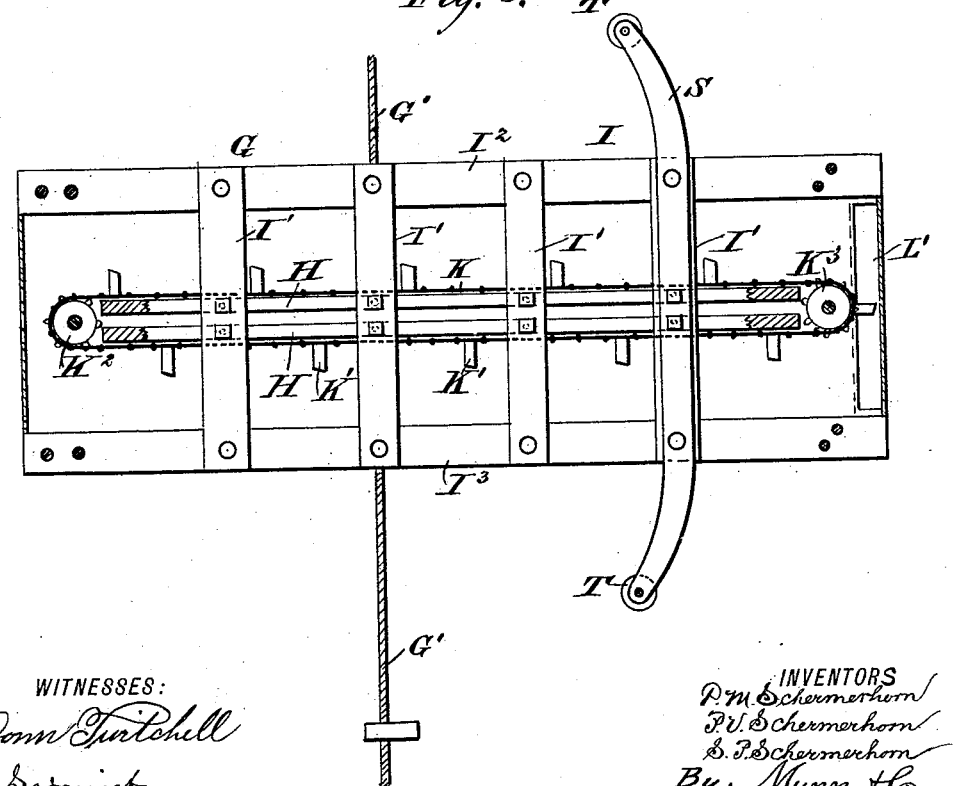

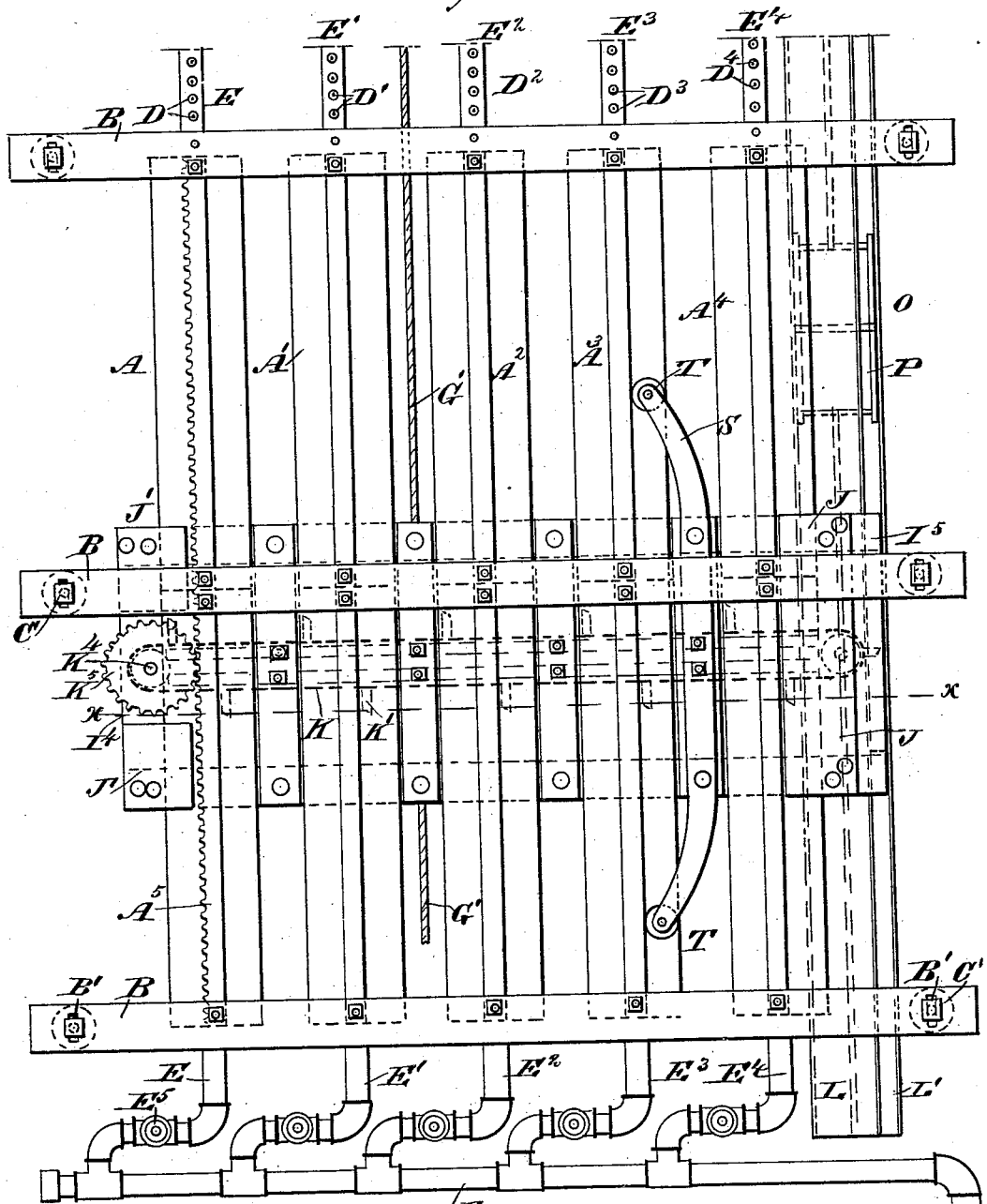

(No Model.) 3 Sheets—Sheet 3.

D. M., P. V. & S. P. SCHERMERHORN.
APPARATUS FOR THE MANUFACTURE OF GAS BLACK.

No. 489,332. Patented Jan. 3, 1893.

WITNESSES:
Donn Twitchell
C. Sedgwick

INVENTORS
D. M. Schermerhorn
P. V. Schermerhorn
S. P. Schermerhorn
By Munn & Co
ATTORNEYS.

UNITED STATES PATENT OFFICE.

DAVID M. SCHERMERHORN, PETER V. SCHERMERHORN, AND SIMON P. SCHERMERHORN, OF WARREN, PENNSYLVANIA; SAID DAVID M. SCHERMERHORN AND PETER V. SCHERMERHORN ASSIGNORS TO SIMON P. SCHERMERHORN.

APPARATUS FOR THE MANUFACTURE OF GAS-BLACK.

SPECIFICATION forming part of Letters Patent No. 489,332, dated January 3, 1893.

Application filed March 21, 1892. Serial No. 425,796. (No model.)

*To all whom it may concern:*

Be it known that we, DAVID M. SCHERMERHORN, PETER V. SCHERMERHORN, and SIMON P. SCHERMERHORN, all of Warren, in the county of Warren and State of Pennsylvania, have invented a new and Improved Apparatus for the Manufacture of Gas-Black, of which the following is a full, clear, and exact description.

The invention relates to devices for manufacturing hydro-carbon gas black from natural or artificially produced gases, and its object is to provide a new and improved apparatus for the said purpose, which is simple, durable and cheap in construction and very effective in operation, producing a high quality of black at a very low cost.

The invention consists of certain parts and details of combinations of the same, as will be hereinafter fully described and then pointed out in the claims.

Reference is to be had to the accompanying drawings forming a part of this specification, in which similar letters of reference indicate corresponding parts in all the figures.

Figure 4:
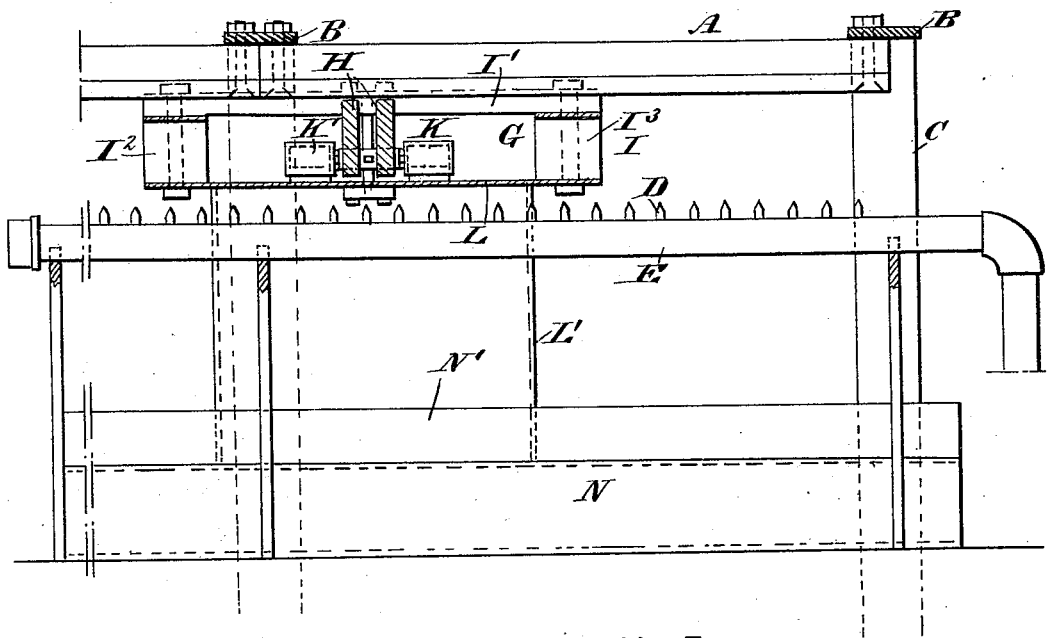
Figure 5:
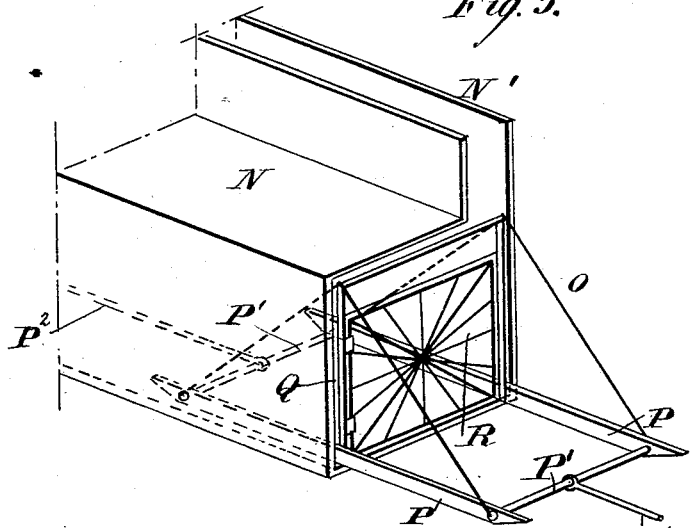

Figure 1 is a plan view of the improvement; Fig. 2 is a transverse section of the same on the line $x$—$x$ of Fig. 1; Fig. 3 is a plan view of the scraper and conveyer, with parts in section; Fig. 4 is a sectional side elevation of the improvement on the line $y$—$y$ of Fig. 2; and Fig. 5 is a perspective view of the receptacle and mechanism for removing and gathering the black therein.

The improved apparatus is provided with a series of longitudinally arranged plates A, A', A$^2$, A$^3$, and A$^4$, preferably in the shape of an inverted T-rail of any desired length, and fastened by the center part or back rib onto transversely extending bars B, supported on suitable posts C. In order to hold the transverse bars B in position on the posts C, bolts C' are employed, passing through longitudinal slots B' in the said bars B, so as to permit longitudinal movement of the said bars to accommodate expansion and contraction of the longitudinal plates A, A', &c.

Below the several plates A, A', &c., are arranged sets of burners D, D', D$^2$, D$^3$ and D$^4$, formed on the top of pipes E, E', E$^2$, E$^3$, and E$^4$, extending longitudinally a suitable distance below the plates A, A', A$^2$, &c. Each of the pipes E, E', E$^2$, &c., is provided with a valve E$^5$ for regulating the supply of gas to the respective pipe, the several pipes being connected with a main supply pipe F provided with a valve F' and connected with a suitable source for the supply of gas, either natural or artificial as the case may be.

Between the sets of burners D &c., and the corresponding set of depositing plates A, A', A$^2$, &c., is arranged a box G adapted to be moved longitudinally by suitable ropes G' set in motion by a suitable mechanism not shown. The box G is provided with two transversely extending scraping plates H attached to the longitudinal bars I' of the box frame I. The bars or slats I' extend between the adjacent edges of two successive plates A, A', A$^2$, &c., so that the carbon scraped off by the scraper plates H cannot pass upward through the space between the two adjacent plates A, A', &c. The longitudinal bars I' are supported on the transverse beams I$^2$ and I$^3$ of the frame I, which latter is connected at its ends by beams I$^4$ and I$^5$, extending along the outermost depositing plates A and A$^4$, as plainly shown in Fig. 2.

On the top of the two beams I$^4$ and I$^5$ are secured guide plates J and J' respectively resting on top of the outermost flanges of the plates A and A$^4$, so that the box G is supported upon the said plates A and A$^4$, which latter form tracks for the said scraper.

Around the scraper plates H passes a conveyer belt or chain K, provided with vertically arranged wings K' preferably spring-pressed, resting on the upper side of a bottom L formed on the frame I. The wings K' discharge at one end of the bottom L into a chute L' extending downward from the said bottom and opening into a channel N' formed on top of a receptacle N for receiving the black. The chain or belt K passes around the sprocket wheels K$^2$ and K$^3$ journaled in the ends of the box frame I, the shaft K$^4$ of the sprocket wheel $K^2$ extending to the top of the frame I and carrying on its upper end a gear wheel $K^5$ in mesh with rack teeth $A^5$ formed on the back rib of the first depositing plate A, as shown in Figs. 1 and 2. When the box G is moved longitudinally, the gear wheel $K^5$ rolls off on the rack teeth $A^5$, so that a rotary motion is given to the shaft $K^4$ and to the sprocket wheel $K^2$ which imparts a traveling motion to the chain K, so that the spring-pressed wings K' move transversely and carry the black contained on the bottom L, into the chute L' through which the black falls in the receptacle N. The latter extends longitudinally throughout the length of the depositing plates A, A', &c., and in this receptacle N is arranged a gathering and removing device O for conveniently moving the black to one end of the receptacle to be passed into the proper barrels or other receptacles for storage or shipment. This device O is provided with two runners P connected at their ends with each other by rungs P', connected with ropes $P^2$ extending in opposite directions, so as to pull the device forward and backward through the receptacle N. In the middle of the runners P is arranged a frame Q extending throughout the height and width of the receptacle N and in this frame is arranged a door R arranged to be closed while the device O is moved in one direction, so that the black contained in the receptacle N is moved to one end of the latter. When the device O is moved in the opposite direction, the door R swings open and remains so until the other end of the receptacle N is reached. The door R is then closed, and on further forward movement of the device O, the black contained in the receptacle N is moved to one end of the same as above described.

On one of the longitudinal bars I' of the scraping frame I is secured a longitudinally extending rod S supporting on its curved ends rollers T traveling on one side of a rib of the depositing plate $A^3$ so as to hold the scraper in the proper position, and to prevent the gear wheel $K^5$ from getting out of mesh with the rack teeth $A^5$.

The operation is as follows: The gas burning at the burners D, D', &c., deposits its carbon on the under side of the plates A, A', $A^2$, &c., respectively, while the more volatile gases pass upward in the space between the adjacent plates A, A', &c. The box G is moved slowly forward and backward on the under side of the depositing plates A, A', $A^2$, &c., so that the scraping plates H scrape off the carbon from the under side of the depositing plates A, A', &c., the carbon falling onto the bottom L of the box frame I. The forward and backward motion of the box G imparts a traveling motion to the belt or chain K, as above described, so that the carbon falling onto the bottom L is carried to one side of the same by the wings K'. The latter also discharge the carbon into the chute L', from which the carbon drops into the receptacle N. The carbon is removed from the latter by the device O in the manner above described, to be filled into barrels or other receptacles ready for shipment.

It will be seen that the supply of gas to the burners D, D', &c., can be conveniently regulated by adjusting the valve F' and the several valves $E^5$. The pipes E, E', $E^2$, &c., are properly supported from underneath, as plainly indicated in Fig. 4.

It will further be seen that the device is very simple and durable in construction, can be cheaply manufactured, and actuated without requiring skilled labor or expensive machinery for setting the several parts in motion. It is understood that the box G as well as the device O, moves very slowly, the speed, however, being governed according to the amount of carbon deposited on the plates A, A', $A^2$, &c., in a given time.

Having thus described our invention, we claim as new, and desire to secure by Letters Patent:—

1. In an apparatus of the class described, the combination with burners arranged in parallel rows, of depositing plates arranged over the said burners and located parallel to each other with intervening spaces to permit the exit of the volatile gases, and a box mounted to travel between the said depositing plates and the said burners, the said box being provided with scrapers adapted to remove the carbon from the said plates, and a traveling belt or chain arranged in the said box and serving to carry the scraped-off carbon to a discharge spout on one side of the box, substantially as shown and described.

2. In an apparatus of the class described, the combination with a series of depositing plates arranged parallel and located suitable distances apart, of a box mounted to travel underneath the said depositing plates and formed with transverse scrapers adapted to remove the carbon from the said plates, and a traveling belt or chain arranged in the said box and formed with wings for moving the scraped off carbon to a discharge spout on one side of the box, substantially as shown and described.

3. In an apparatus of the class described, the combination with a series of depositing plates arranged parallel and located suitable distances apart, of a box mounted to travel underneath the said depositing plates and formed with transverse scrapers adapted to remove the carbon from the said plates, a traveling belt or chain arranged in the said box and formed with wings for moving the scraped off carbon to a discharge spout on one side of the box, and bars or slots held on the said box and extending between two adjacent depositing plates so as to close the space between the said depositing plates to prevent the scraped-off carbon from passing upward, substantially as shown and described.

4. In an apparatus of the class described, the combination with a box mounted to travel and provided with scraper plates, of a traveling chain or belt arranged in the said box and passing around the said scraping plates, the said chain or belt being formed with wings for moving the carbon to a discharge spout on one side of the box, substantially as shown and described.

5. In an apparatus of the class described, the combination with a series of depositing plates arranged parallel and located suitable distances apart, of a box mounted to travel underneath the said depositing plates and formed with transverse scrapers adapted to remove the carbon from the said plates, a traveling belt or chain formed with wings for moving the scraped-off carbon to a discharge spout on one side of the box, and a carbon receiving receptacle connected with the discharge end of the said box to receive the carbon moved by the wings of the said endless chain or belt, substantially as shown and described.

6. In an apparatus of the class described, the combination with a series of depositing plates arranged parallel and located suitable distances apart, of a box mounted to travel underneath the said depositing plates and formed with transverse scrapers adapted to remove the carbon from the said plates, a traveling belt or chain for moving the scraped-off carbon to a discharge spout on one side of the box, a chute extending from the discharge end of the said box, and a receiving receptacle or box into which discharges the said chute, substantially as shown and described.

7. In an apparatus of the class described, the combination with a series of longitudinally extending depositing plates arranged parallel and located suitable distances apart and of which one is formed with rack teeth, of a box having a discharging spout and mounted to travel on the under sides of the said plates and comprising a frame supported from and traveling on the outermost depositing plates, scraping plates held in the said frame and arranged transversely to the said depositing plates, a chain provided with wings and adapted to travel around the said scraping plates, sprocket wheels over which passes the said chain, and a gear wheel secured on one of the shafts of the said sprocket wheels, and in mesh with the rack teeth of one of the depositing plates, substantially as shown and described.

8. In an apparatus of the class described, the combination with a series of longitudinally extending depositing plates arranged parallel and located suitable distances apart and of which one is formed with rack teeth, of a box mounted to travel on the under sides of the said plates and comprising a frame supported from and traveling on the outermost depositing plates, scraping plates held in the said frame and arranged transversely to the said depositing plates, a chain provided with wings and adapted to travel around the said scraping plates, sprocket wheels over which passes the said chain, a gear wheel secured on one of the shafts of the said sprocket wheels and in mesh with the rack teeth of one of the depositing plates, and a chute extending from one side of the said box and into which discharge the wings of the said chain, substantially as shown and described.

DAVID M. SCHERMERHORN.
PETER V. SCHERMERHORN.
SIMON P. SCHERMERHORN.

Witnesses:
  W. V. N. YATES,
  J. B. CABLE.